US011251600B2

(12) United States Patent
Trumbo et al.

(10) Patent No.: US 11,251,600 B2
(45) Date of Patent: Feb. 15, 2022

(54) OVERVOLTAGE PROTECTION COMBINED WITH OVERCURRENT PROTECTION

(71) Applicant: Honeywell International Inc., Morris Plains, NJ (US)

(72) Inventors: Dale A Trumbo, Tucson, AZ (US); Jun Jing, Shanghai (CN); Serdar Tevfik Sozusen, Pine Brook, NJ (US); Alex Wedin, Tucson, AZ (US); Pengfei Zhan, Shanghai (CN); Jian Lin, Shanghai (CN)

(73) Assignee: Honeywell International Inc., Charlotte, SC (US)

( * ) Notice: Subject to any disclaimer, the term of this patent is extended or adjusted under 35 U.S.C. 154(b) by 94 days.

(21) Appl. No.: 16/790,632

(22) Filed: Feb. 13, 2020

(65) Prior Publication Data

US 2021/0257826 A1    Aug. 19, 2021

(51) Int. Cl.
*H02H 3/10* (2006.01)
*H02H 1/00* (2006.01)

(52) U.S. Cl.
CPC ............ *H02H 3/10* (2013.01); *H02H 1/0007* (2013.01)

(58) Field of Classification Search
CPC ........ H02H 1/0007; H02H 3/08; H02H 3/087; H02H 3/093; H02H 3/10; H02H 7/20; H02H 9/025; H02J 7/0021; H02J 7/0026
See application file for complete search history.

(56) References Cited

U.S. PATENT DOCUMENTS

| | | | |
|---|---|---|---|
| 6,347,028 B1 | 2/2002 | Hausman, Jr. et al. | |
| 7,149,098 B1 | 12/2006 | Chen | |
| 7,379,310 B2 | 5/2008 | Louvel et al. | |
| 7,447,502 B2 * | 11/2008 | Buckley | H04W 48/18 370/331 |

(Continued)

OTHER PUBLICATIONS

Analog Devices "LTC7000/LTC7000-1" Fast 150V Protected High Side NMOS Static Switch Driver ,Retrieved from the Internet: <https://www.analog.com/media/en/technical-documentation/data-sheets/ltc7000-7000-1.pdf> (Year: 2018).*

(Continued)

*Primary Examiner* — Jared Fureman
*Assistant Examiner* — Nicolas Bellido
(74) *Attorney, Agent, or Firm* — Shumaker & Sieffert, P.A.

(57) ABSTRACT

Protection circuitry configured to protect an electrical load from both overvoltage and overcurrent and includes a recovery period timer configured to set a recovery time. The recovery time allows a system, including a power supply, voltage regulator, protection circuitry and electrical load to dissipate heat and reset components. The protection circuitry is configured to monitor downstream performance of the electrical load and disconnect upstream power based on a downstream failure or other performance characteristics. The protection circuitry may include a downstream overvoltage sensing circuit that controls a current source. The current source injects current into an overcurrent protection loop in the protection circuitry that includes the configurable recovery period timer. In this manner both an overvoltage and an overcurrent event may take advantage of the configurable recovery period timer without the need for a separate time delay circuit.

20 Claims, 5 Drawing Sheets

(56) References Cited

U.S. PATENT DOCUMENTS

| | | |
|---|---|---|
| 9,660,516 B2 | 5/2017 | Fogg |
| 9,899,826 B2* | 2/2018 | Fomenko ............. H02H 3/0935 |
| 10,615,586 B2* | 4/2020 | Kozuki ................. H02H 3/093 |
| 2011/0110009 A1* | 5/2011 | Sugimoto ........... H03K 17/0822 |
| | | 361/93.1 |
| 2012/0098517 A1* | 4/2012 | Esumi ...................... H02H 3/08 |
| | | 323/311 |
| 2014/0347774 A1* | 11/2014 | Uehara ................ H02H 3/0935 |
| | | 361/87 |
| 2017/0126222 A1* | 5/2017 | O'Sullivan ...... H03K 17/08122 |
| 2021/0006242 A1* | 1/2021 | Takagiwa ........... H03K 17/0826 |

OTHER PUBLICATIONS

Analog Devices, "LTC7000/LTC7000-1," Revision C. Feb. 2019, 28 pp.

Corey, "Calculating Accuracy in High-Side Current-Sense Amplifiers," Electronic Design, accessed from https://www.electronicdesign.com/analog/calculating-accuracy-high-side-current-sense, published online Mar. 16, 2016, 12 pp.

Texas Instruments, "TLV170x 2.2-V to 36-V, microPower Comparator," SBOS589D, revised Jun. 2015, 33 pp.

* cited by examiner

OVERVOLTAGE PROTECTION COMBINED WITH OVERCURRENT PROTECTION

TECHNICAL FIELD

The disclosure relates to power supply protection circuits.

BACKGROUND

In electric power systems, a voltage regulator is an electric device that supplies stable power to an electric load. Voltage regulators are typically designed to maintain an output voltage within specified limits even as an electrical load supported by the voltage regulator changes or as the supply power fluctuates. However, the output voltage of the regulator may exceed a maximum rated voltage of the electrical load if a fault or failure occurs in the voltage regulator or in the power supply. In some examples, the electrical load may be damaged by an overvoltage. Similarly, an overcurrent may occur if a larger electric current than intended goes through the load device. An overcurrent could lead to excessive generation of heat, fire, or damage to equipment that is part of the electrical load. A power system may include comprehensive protection mechanisms including overvoltage and overcurrent protection to protect the electrical load from damage.

SUMMARY

In general, the disclosure describes protection circuitry configured to protect an electrical load from both overvoltage and overcurrent. The protection circuitry includes a circuitry recovery period timer configured to set a recovery time. The recovery time allows a system, including a power supply, voltage regulator, protection circuitry, and electrical load to dissipate heat and reset components. The protection circuitry is configured to monitor downstream performance of the electrical load and disconnect upstream power based on a downstream failure or other performance characteristics. The protection circuitry may include a downstream overvoltage sensing circuit that controls an enhanced current source. The enhanced current source injects current into an overcurrent protection loop that includes the configurable recovery period timer. In this manner, both an overvoltage and an overcurrent event may take advantage of the configurable recovery period timer without the need for a separate time delay circuit.

In one example of the disclosure, a circuit includes a switch comprising a control input (gate of Q3), wherein the switch is configured to control power supplied to a load, and a switch driver circuit comprising: a first sense input (SNS+) and a second sense input (SNS−); a switch control output coupled to the control input of the switch; logic circuitry coupled to the first sense input and the second sense input, the logic circuitry configured to: determine whether a first current through the switch satisfies a threshold, based on signals from the first sense input and the second sense input, wherein the switch driver circuit is configured to: receive a second current at the second sense input; determine whether a third current satisfies the threshold, wherein the third current comprises the first current and the second current; and in response to determining that the third current satisfies the threshold, the logic circuitry is configured to cause the switch control output to turn off the switch.

In another example, a system includes a first power supply circuit and a second power supply circuit (100); a switch (Q3) configured to control power delivered to the first power supply circuit and the second power supply circuit; a switch driver circuit: comprising: a first sense input (SNS+) and a second sense input (SNS−); a switch control output coupled to the control input of the switch; logic circuitry coupled to the first sense input and the second sense input, the logic circuitry configured to: determine whether a first current through the switch satisfies a threshold, based on signals from the first sense input and the second sense input, wherein the switch driver circuit is configured to: receive a second current at the second sense input; determine whether a third current satisfies the threshold, wherein the third current comprises the first current and the second current; and in response to determining that the third current satisfies the threshold, the logic circuitry is configured to cause the switch control output to turn off the switch.

In another example, a method includes based on signals from a sense input terminal (SNS+ or SNS−) of a switch driver circuit, determining, by the switch driver circuit, whether a first current through a switch satisfies a current threshold limit, wherein the switch is configured to control power supplied to an electrical load; receiving at the sense input terminal, a second current, wherein the second current is generated by a current source; based on the signals from the sense input terminal, determining, by the switch driver circuit, whether a third current satisfies the current threshold limit, wherein the third current comprises a combination of the first current and the second current; in response to either the first current or the third current satisfying the current threshold limit, controlling, by the switch driver circuit, the switch such that the switch prevents power from flowing through the switch to the electrical load; starting a recovery timer, wherein the switch driver circuit is prevented from controlling the switch to restore power to the electrical load until the recovery timer indicates that a predetermined recovery time period has expired.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes protection circuitry configured to protect an electrical load from both overvoltage and overcurrent. The protection circuitry includes circuitry configured to set a recovery time. The protection circuitry is configured to monitor downstream performance of the electrical load and disconnect upstream power based on a downstream failure or based other performance characteristics. Examples of other characteristics may include temperature, pressure, fire detection, mechanical damage, interactions with other systems and similar characteristics.

The recovery time allows a system, including a power supply, voltage regulator, protection circuitry, and electrical load to dissipate heat and reset components. The protection circuitry may include a downstream overvoltage sensing circuit that controls an enhanced current source. The enhanced current source injects current into an overcurrent protection loop that includes the configurable recovery period timer. In this manner both an overvoltage and an overcurrent event may take advantage of the configurable recovery period timer without the need for a separate time delay circuit.

The protection circuitry includes a switch arranged between the output of a voltage regulator and the electrical load that receives upstream power from the output of the voltage regulator. The protection circuitry further includes a switch driver circuit with internal logic circuitry and the configurable recovery period timer. The logic circuitry may receive an indication of the voltage and current supplied to the electrical load via the switch. If the logic circuitry determines that an overvoltage or an overcurrent event has started, the logic circuitry may cause the switch driver circuit to open the switch to prevent power from being supplied to the electrical load. Similarly, in the event of a downstream overvoltage, or other triggering event, a triggering circuit may cause the enhanced current source to inject current into the overcurrent protection loop. The logic circuitry is configured to detect the injected current, treat the injected current as an overcurrent event and cause the switch to open, disconnecting the upstream supplied power. In some examples, the logic circuitry may monitor a delay timer and wait until the delay timer expires after the trigger detection and before causing the switch to open. In some examples the logic circuitry also waits for the recovery timer to expire before closing the switch and allowing power to flow to the electrical load.

Figure 1:
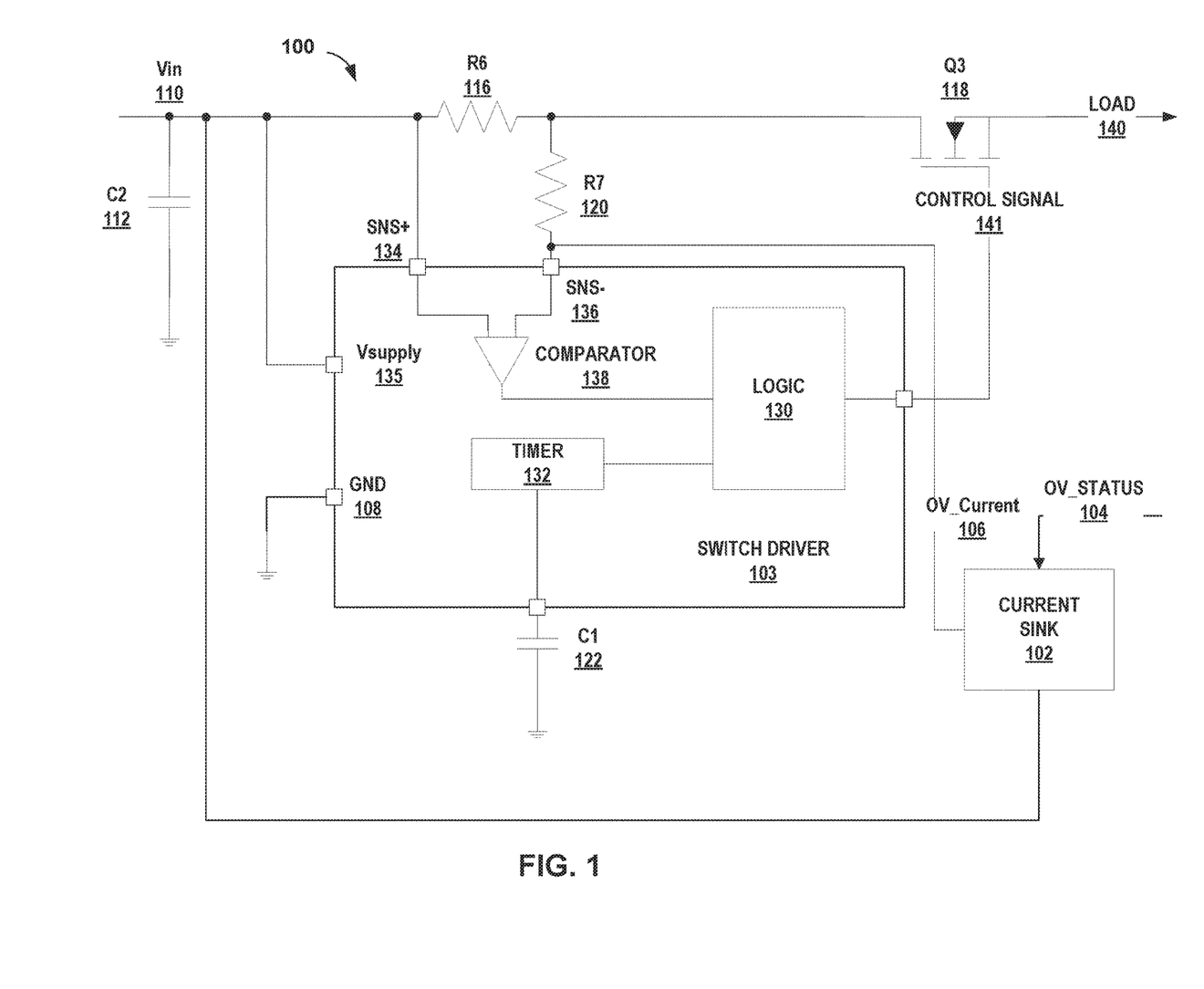
FIG. 1 is a block diagram illustrating an example of protection circuitry configured to protect an electrical load from both overvoltage and overcurrent according to one or more techniques of this disclosure.

FIG. 1 is a block diagram illustrating an example of protection circuitry configured to protect an electrical load from both overvoltage and overcurrent according to one or more techniques of this disclosure. Circuit 100 may be placed between a voltage regulator for a power supply and one or more electrical loads 140.

Circuit 100 includes a switch Q3 118 that controls power supplied to load 140, switch driver circuit 103, current sink 102, a resistor network including R6 116 and R7 120, and may include one or more capacitors C2 112. Switch driver circuit 103 outputs switch control signal 141 to a control input of switch Q3 118. In the example of circuit 100, the control input is the gate of Q3 118. The source of Q3 118 connects to the one or more electrical loads 140 and the drain of Q3 118 connects to the node between resistors R6 116 and R7 120. The drain of Q3 118 connects to one of two sense input terminals, SNS− 136, of switch driver 103 through resistor R7 120. Another sense input terminal, SNS+ 134 of switch driver 103, connects to the output voltage from a voltage regulator or similar power source, Vin 110. Sense input terminal SNS+ 134 also connects to the opposite terminal of R6 116 from the terminal of R6 116 connected to the drain of Q3 118.

Some examples of circuit 100 may include one or more capacitors C2 112. In the example of circuit 100, C2 112 connects Vin 110 to ground. The value of C2 112 may be selected to couple high frequency ripple or other electromagnetic interference (EMI) such as electrostatic discharge (ESD) to ground.

Switch driver circuit 103 also includes logic circuitry, logic 130, coupled to sense input terminals SNS+ 134 and SNS− 136 through comparator 138. In the example of FIG. 1, a first input of comparator 138 connects to SNS+ 134 and a second input of comparator 138 connects to SNS− 136. The output of comparator 138 connects to logic 130. Logic 130 also connects to timer circuitry 132. Timer circuitry 132 connects to ground through capacitor C1 122. Switch driver circuit 103 is supplied with power via power supply terminal Vsupply 135 and connects to ground via ground terminal GND 108.

Switch driver circuit 103 also receives a current signal OV_Current 106 at sense terminal SNS− 136 from current sink 102. Current sink 102 is supplied with power by connecting to Vin 110 and receives OV_status signal 104.

In operation, the value of R6 116 may be selected to be very small, e.g. less than one ohm, and in some examples may be referred to as a shunt resistor. Comparator 138 monitors the voltage across R6 116 via signals received at SNS+ 134 and SNS− 136. When the voltage across SNS+ 134 and SNS− 136 satisfies a threshold value, for example Vth of comparator 138, then comparator 138 sends a signal to logic 130.

The voltage detected by switch driver 103 at SNS+ 134 and SNS− 136 indicates the current through R6 116 and thus through Q3 118. In some examples, the value of R6 116 and R7 117 may be selected to determine the amount of current through switch Q3 that causes the voltage across SNS+ 134 and SNS− 136 to satisfy the threshold. In other examples, the selection of R6 116 and R7 117, along with other settings within switch driver 103 (not shown in FIG. 1) may determine the threshold that triggers the signal from comparator 138 to logic 130.

Logic 130 is configured to isolate the power supplied by Vin 110 from load 140 by turning off switch Q3 118 via control signal 141 in response to determining that the current through Q3 116 satisfies a threshold current magnitude. In other words, in response to the signals from SNS+ 134 and SNS− 136 indicating that a voltage across R6 116 indicates an overcurrent condition, then logic 130 is configured to turn off switch Q3 118. In an overcurrent condition the magnitude of the current through Q3 116 is greater than the threshold current magnitude.

In some examples, switch driver 103 may delay turning off switch Q3 118 until a delay time period has expired. Timer circuitry 132 may be configured to start the delay time period when logic 130 determines that the current satisfies the threshold current. Logic 130 may be configured to prevent the control signal 141 that turns off switch Q3 118, from being output, until the delay time period has expired. Instead, logic 130 may output the control signal 141 that keeps Q3 118 turned on while timer circuitry 132 counts down the delay time period. In some examples, the capacitance value of C1 122 may be selected to adjust the length of the delay time period.

Timer circuitry 132 may also include a recovery timer, which configured to determine when a recovery time period has expired. In some examples, the recovery timer is configured to start the recovery time period when logic 130 causes the switch control signal 141 at the switch control output terminal to turn off switch Q3 118. Turning off Q3 118 may reduce the current through R6 116 and therefore reduce the voltage across R6 116. However, recovery timer function of timer circuitry 132 may be configured to prevent logic 130 from turning on switch Q3 118 until the recovery time period has expired.

Current sink 102 is circuitry that is coupled directly to SNS− 136. Current sink 102 may also be referred to as a "current source" in this disclosure. Current sink 102 receives a logical signal via a status input terminal ("OV_status 104). In the example of FIG. 1, when OV_status 104 is a digital LOW or ZERO, current sink 102 is configured to sink a current, OV_current 106, of a predetermined magnitude. In other examples current sink 102 may be configured to sink the same predetermined magnitude of current when OV_status 104 is a digital HIGH or ONE. The deterministic current, OV_current 106 pulls additional current through resistors R6 116 and R7 120, thus causing the new current through R6 116 to be the sum of the current through switch Q3 118 and OV_current 106. In some examples, the current through Q3 116 may be below the threshold current magnitude, but by sinking the additional OV_current 106, the combined current through R6 116 may satisfy the threshold magnitude of current to cause comparator 138 to send an overcurrent signal to logic 130. In other words, comparator determines that the voltage across SNS+ 134 and SNS− 136, caused by the combined current satisfies the threshold, which triggers logic 130 to cause the switch control signal 13 to turn off switch Q3 116.

The signal for OV_status 104 may come from any variety of sources. In some examples, OV_status 104 may be output from one or more overvoltage measurement circuits for one or more downstream power supplies or other electrical loads that are included in load 140. Any one of several overvoltage circuits may trigger current sink circuitry 102 to turn on OV_current 106. In another example, OV_status 104 may come from other detection circuitry. For example, a microprocessor may monitor any number of parameters, such as via an A 2D input terminal, and output OV_status 104 based on determining, for example, a high temperature exists in one of the loads, a fault condition exists or detecting some other flag for which the power to load 140 should be cut off. An example of a flag that may be generated includes detecting mechanical damage to a component that may affect the operation of load 140. In this manner, the configuration of switch driver 103 may utilize the over current protection circuitry and timer circuitry 132 of switch driver 103 to protect load 140 from a variety of conditions, including overvoltage, faults or other conditions.

Figure 2:
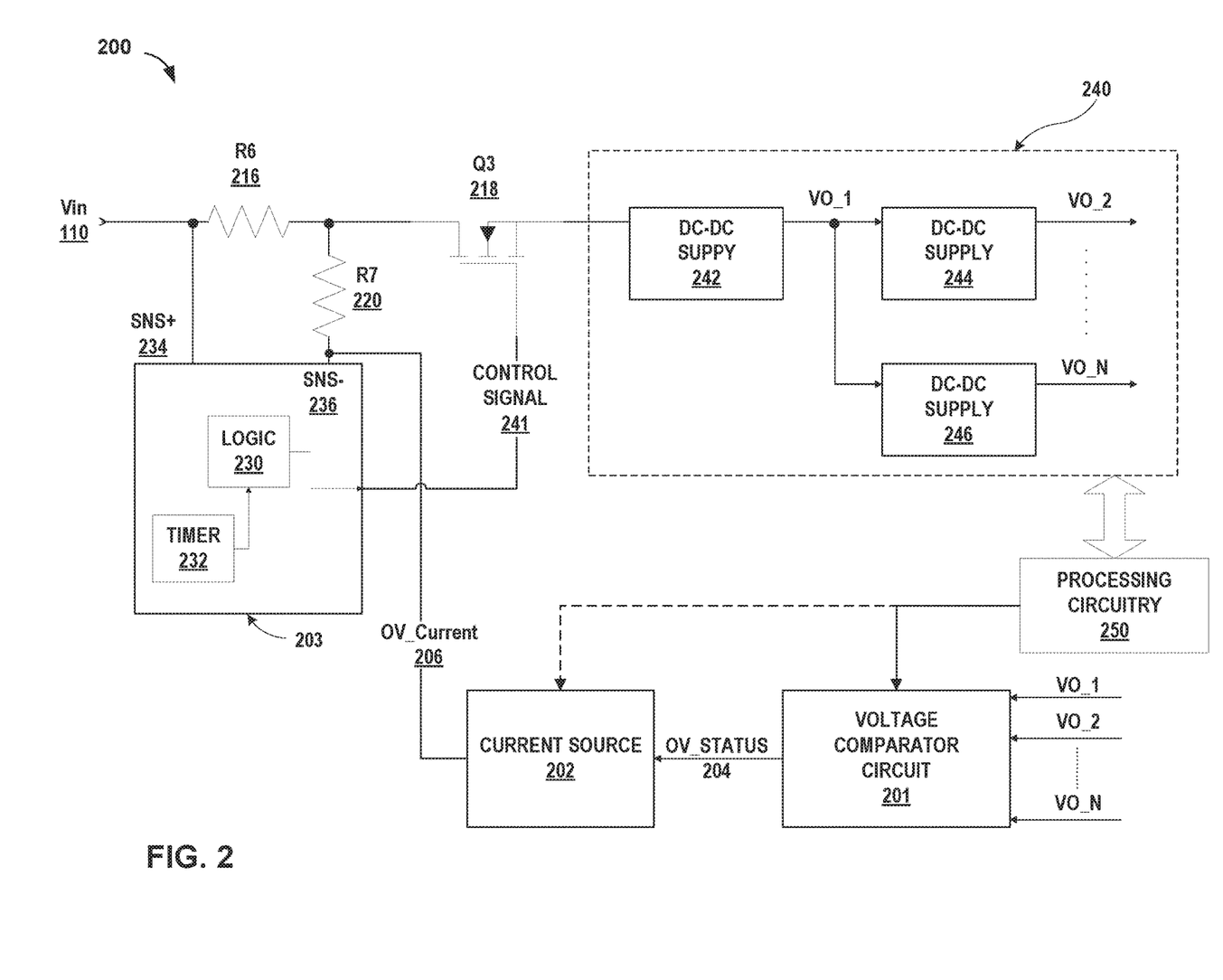
FIG. 2 is a block diagram illustrating an example system including the protection circuitry according to one or more techniques of this disclosure.

FIG. 2 is a block diagram illustrating an example system including the protection circuitry according to one or more techniques of this disclosure. System 200 includes: switch Q3 218, resistors R6 216 and R7 220, load 240, current source 202, switch driver circuit 203 with logic 230, and timer 232. Switch Q3 218, resistors R6 216 and R7 220, load 240, current source 202, switch driver circuit 203 with logic 230, and timer 232 are, respectively, examples of switch Q3 118, resistors R6 116 and R7 120, load 140, current sink 102, switch driver circuit 103 with logic 130, and timer 132 of FIG. 1. The connections, characteristics and functions of switch Q3 218, resistors R6 216 and R7 220, load 240, current source 202, switch driver circuit 203 with logic 230, and timer 232 may be similar or the same as the characteristics and functions of, respectively, switch Q3 118, resistors R6 116 and R7 120, load 140, current sink 102, switch driver circuit 103 with logic 130, and timer 132 described above in relation to FIG. 1. For example, though current source 202 is referred to as a source, rather than a current sink, the functions and characteristics of current source 202 are the same as those of current sink 102.

Load 240 includes several DC-DC power supplies, which may supply further power supplies or other loads not shown in FIG. 2. In some examples, a DC-DC power supply may also be referred to as a power converter. The output of DC-DC supply 242, VO_1 provides power to other supplies including DC-DC supply 244 and DC-DC supply 246. The output of DC-DC supplies 242 through 246, i.e. VO_2-VO_N respectively, may be monitored by voltage comparator circuit 201. Though only DC supply 244 and DC-DC supply 246 are depicted in system 200, load 240 may include additional DC-DC supplies not shown in FIG. 2.

Processing circuitry 250 may also send and receive signals to any components of load 240. For example, processing circuitry 250 may send control signals or monitor, status, conditions and output signals of any of DC-DC supplies within load 240. In some examples, processing circuitry 250 may output a signal to voltage comparator circuit 201, which may control logical signal of OV_status 204. In other examples, processing circuitry 250 may output a signal to voltage comparator circuit 201, directly to current source 202 or to both.

Examples of processor in processing circuitry 250 may include any one or more of a microcontroller (MCU), e.g. a computer on a single integrated circuit containing a processor core, memory, and programmable input/output peripherals, a microprocessor (μP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processor" or "controller," as used herein, may refer to any one or more of the foregoing structures or any other structure operable to perform techniques described herein. Similarly, logic 230, and logic 130 described above in relation to FIG. 1, may be implemented as any structure operable to perform techniques described herein.

Voltage comparator circuit 201 may compare a respective output voltage, i.e. VO_1-VO_N, of each of the one or more power supply circuits of load 240 to a respective threshold voltage magnitude. The respective threshold voltage magnitude for each power supply circuit may be selected such that exceeding the respective threshold voltage magnitude indicates an overvoltage condition for the respective power supply. In some examples, voltage comparator circuit 201 may be implemented by a respective comparator circuit for each respective power supply. Each respective comparator circuit is configured to generate the logical signal, OV_status 204, received by current source based on the comparison. In other examples, voltage comparator circuit 201 may be implemented by processing circuitry, which may include an analog-to-digital converter.

In operation, voltage comparator circuit 201 outputs logical signal, OV_status 204, to current source 202. Based on the comparison of the respective output voltage to the respective threshold voltage magnitude, when voltage comparator circuit 201 determines any one or more of the power supplies in load 240 have an overvoltage condition, then voltage comparator circuit 201 may output, for example, a logical LOW on OV_status 204. In response to receiving the logical LOW on OV_status 204, current source 202 may cause additional current, OV_current 206, to flow through R6 216 and R7 220. When the switch driver circuit 203 determines the combined current through R6 216 satisfies the overcurrent threshold, based on the signals from SNS+ 234 and SNS− 236, the logic 230 of switch driver 203 may output a signal to Q3 218, via control signal 241, to turn off Q3 218 and isolate load 240 from the power supplied to the Vin 110 terminal. In some examples, switch driver circuit 203 may delay the signal to turn off Q3 218 based on the delay timer of timer 232, as described above in relation to FIG. 1. One example of a switch driver circuit may include the LTC7000 driver by Analog Device.

As described above in relation to FIG. 1, processing circuitry 250 may monitor various conditions or signals of load 240, such as temperature, timing, e.g. a delay in an expected signal, fault conditions, one or more signals outside of a specified range, and so on. Processing circuitry may output a signal, such as a logical signal, to either current source 202 or to voltage comparator circuit 201. In some examples, one or more of the monitored conditions or signals may cause processing circuitry 250 to send a signal that causes current source 202 to draw the predetermined additional current through R6 216. Therefore, in some examples, the logical signal, e.g. OV_status 204, received by current source is based on a non-voltage condition.

Figure 3:
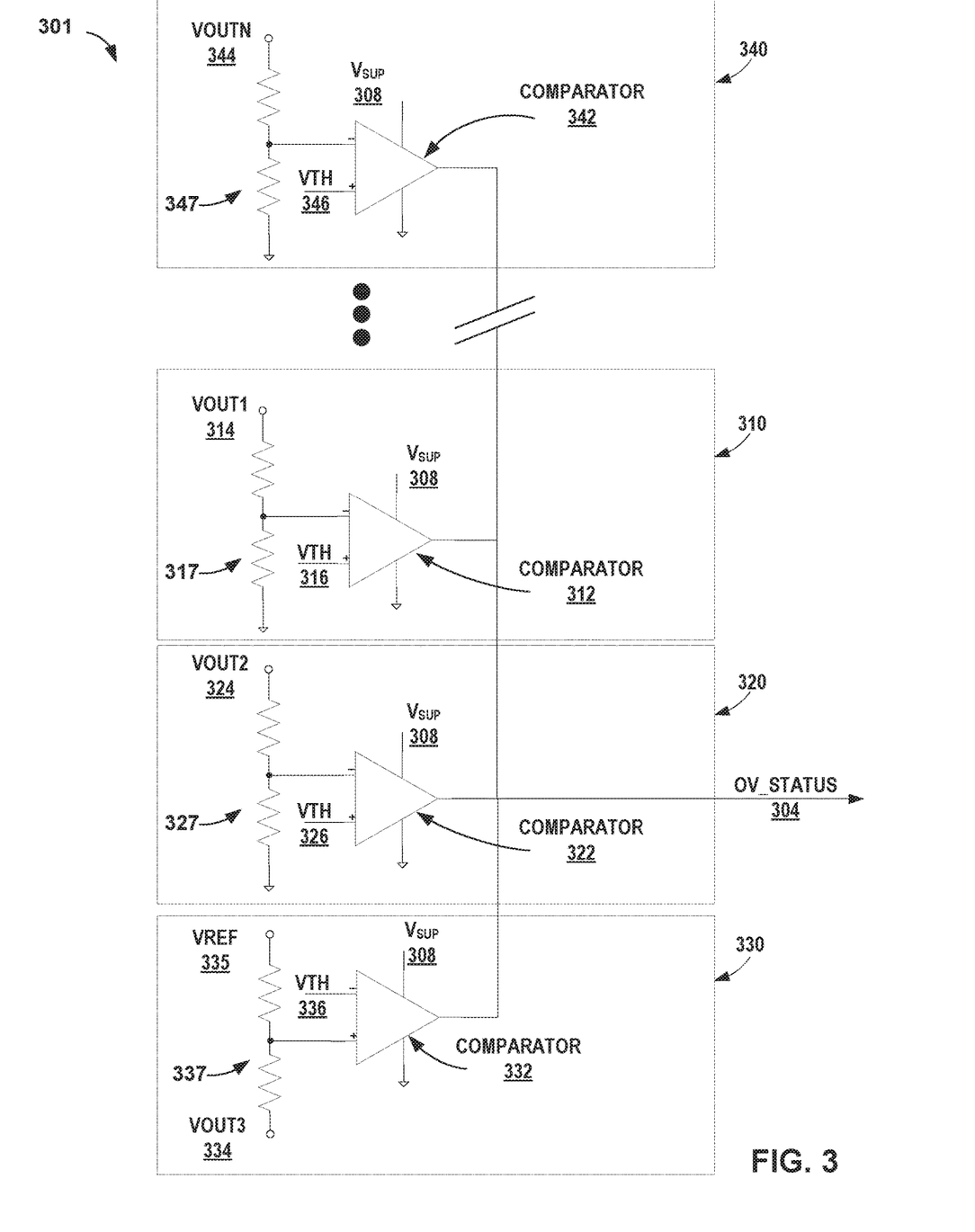
FIG. 3 is a schematic diagram illustrating an example implementation of comparator circuits configured to compare a monitored voltage to a threshold voltage.

FIG. 3 is a schematic diagram illustrating an example implementation of comparator circuits configured to compare a monitored voltage to a threshold voltage. Circuit 301 is an example implementation of circuit 201, described above in relation to FIG. 2.

In general, for circuit 301, a respective output voltage Vout1 314-VoutN 344 of each of one or more power supply circuits in the load is compared to a respective threshold voltage magnitude by a respective comparator circuit 310-340. Output voltages Vout1 314-VoutN 344 in circuit 301 are examples of the output voltages VO_1-VO_N for DC-DC supplies 242-246 in load 240, described above in relation to FIG. 2. Comparator circuits 310, 320 and 340 are configured for positive overvoltage monitoring. Comparator circuit 330 is configured for negative overvoltage monitoring. The outputs of these comparator circuits are connected in wired-OR configurations, which means the common output OV_Status 304 is pulled down to low potential when a monitored voltage has satisfied the respective voltage threshold. OV_status 304 is an example of a logical signal similar to OV_status 104 and OV_status 204 described above in relation to FIGS. 1 and 2. When all monitored voltages are within limits, i.e. have not satisfied any respective threshold, OV_status 304 outputs a logical HIGH. In some examples, a general-purpose comparator may be used to implement circuit 301 for overvoltage or under voltage detection. One example comparator may include the Texas Instruments TLV170x series comparators.

Comparator circuit 310 includes comparator 312, which receives the supply output voltage Vout1 314 through resistor divider 317 at the inverting input of comparator 312. The respective threshold voltage magnitude Vth 316 connects to the non-inverting input of comparator 312. The output of comparator 312 connects to the circuit output OV_status 304. Comparator 312 is also connected to supply voltage Vsup 308 and ground. In some examples, Vsup 308 may be the same as Vin 110 described above in relation to FIG. 1. In other examples Vsup 308 may come from a separate power supply, such as a digital power supply Comparator circuit 320 includes comparator 322, which receives the supply output voltage Vout2 324 through resistor divider 327 at the inverting input of comparator 322. The respective threshold voltage magnitude Vth 326 connects to the non-inverting input of comparator 322. The output of comparator 322 connects to the circuit output OV_status 304. Comparator 322 is also connected to supply voltage Vsup 308 and ground. The voltage at Vout2 324 satisfies the threshold Vth 326 when the voltage to the inverting input of comparator 322 is greater than the threshold voltage Vth 326 (overvoltage).

Comparator circuit 330 includes comparator 332, which receives the supply output voltage Vout3 334 through resistor divider 337 at the non-inverting input of comparator 332. Unlike comparator circuits 310, 320 and 340, on the opposite terminal of resistor divider 337 is Vref 335. In some examples, Vref 335 may be connected to ground. In other examples, Vref 335 may be connected to a different reference voltage. The respective threshold voltage magnitude Vth 336 connects to the inverting input of comparator 332. The output of comparator 332 connects to the circuit output OV_status 304. Comparator 332 is connected to supply voltage Vsup 308 and ground. The voltage at Vout3 334 satisfies the threshold Vth 336 when the voltage to the non-inverting input of comparator 332 is less than the threshold voltage Vth 336 (under voltage).

Comparator circuit 340 includes comparator 342, which receives the supply output voltage Vout1 344 through resistor divider 347 at the inverting input of comparator 342. The respective threshold voltage magnitude Vth 346 connects to the non-inverting input of comparator 342. The output of comparator 342 connects to the circuit output OV_status 304. Comparator 342 is also connected to supply voltage Vsup 308 and ground.

In operation each respective comparator circuit is configured to generate the logical signal OV_status 304 received by the current source, such as current source 202 described above in relation to FIG. 2. In some examples, an output from processing circuitry 250 depicted in FIG. 2 may also be coupled with logical signal OV_status 304 (not shown in FIG. 3).

Figure 4:
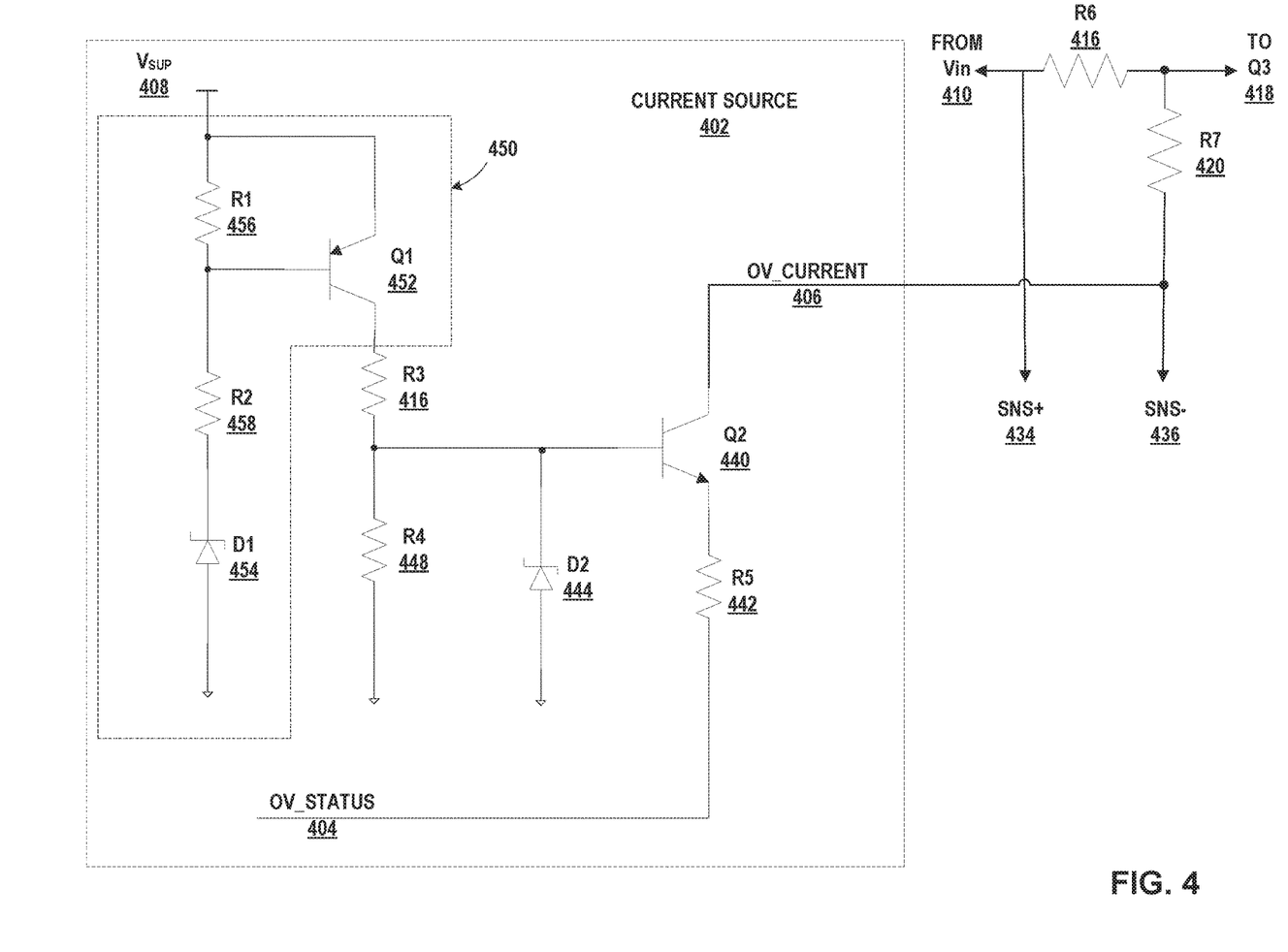
FIG. 4 is a schematic diagram illustrating an example of an enhanced current source circuit with power supply monitoring according to one or more techniques of this disclosure.

FIG. 4 is a schematic diagram illustrating an example of an enhanced current source circuit with power supply monitoring according to one or more techniques of this disclosure. The enhanced portion of current source circuit 402 includes the supply voltage verification circuit 450. Current source 402 is an example of current sink circuit 102 and current source circuit 202 described above in relation to FIGS. 1 and 2.

FIG. 4 also includes: an output to switch Q3 418, resistors R6 416 and R7 420, sense inputs SNS+ 434 and SNS− 436, supply current Vin 410. Switch Q3 418, resistors R6 416 and R7 420, sense inputs SNS+ 434 and SNS− 436, supply current Vin 410 are, respectively, examples of switch Q3 118, resistors R6 116 and R7 120, sense inputs SNS+ 134 and SNS− 136, supply current Vin 110. The characteristics and functions of switch Q3 418 (not shown in FIG. 4), resistors R6 416 and R7 420, sense inputs SNS+ 434 and SNS− 436, supply current Vin 410 may be similar or the same as the characteristics and functions of, respectively, switch Q3 118, resistors R6 116 and R7 120, sense inputs SNS+ 134 and SNS− 136, supply current Vin 110 described above in relation to FIG. 1.

Current source circuit 402 includes NPN bipolar transistor (BJT) Q2 440, Zener diode D2 444 and a resistor divider formed by resistors R3 416 and R4 448. As described above in relation to FIGS. 1 and 2, the output current terminal OV_current 402 connects to SNS− 436 of a switch driver circuit, such as switch driver circuits 103 and 203. Resistor R6 416 is connected between Vin 410 and switch Q3 418 (not shown in FIG. 4) to measure the current through switch Q3 418. Resistor R7 420 connects the switch side of resistor R6 416 to SNS− 436. Sense input SNS+ 434 connects to Vin 410.

The collector of Q2 440 connects to SNS− 436 and carries the predetermined additional current via OV_current 406. The emitter of Q2 440 connects to OV_status 404, which is the logical signal from a voltage comparator circuit such as voltage comparator circuits 201 and 301 described above in relation to FIGS. 2 and 3. The base of Q2 440 is biased by the voltage divider made up of resistors R3 426 and R4 448. The base of Q2 440 connects to the node between resistors R3 426 and R4 448 and to the cathode of diode D2 444. The anode of D2 444 connects to ground. The base of Q2 440 connects to ground through resistor R4 448 and to supply voltage verification circuit 450 through resistor R3 426.

In operation, current source 402 may receive a logical signal via OV_status 404 from, for example, voltage comparator circuits 201 or 301 described above in relation to FIGS. 2 and 3. When none of the power supply voltages satisfy an overvoltage threshold, and no trigger signal comes from processing circuitry, e.g. processing circuitry 250 depicted in FIG. 2, then the logical signal on OV_status 404 will be a logical HIGH. In other words, when all monitored voltages are within operating limits, the common output OV_status 404 from the voltage comparators circuits is open-collector, therefore Q2 440 is cut off and OV_current 406 is an open-collector output.

When any power supply voltage satisfies the respective overvoltage threshold magnitude, the respective comparator circuit will output a logical LOW on OV_status 404. The collector of Q2 440 will sink deterministic current from the current sensing loop of the switch driver circuit via OV_current 406. That is, Q2 440 sinks a predetermined magnitude of additional current through R6 416 and R7 420. The overcurrent protection mechanism of switch driver circuit, such as switch driver circuits 103 and 203 described above in relation to FIGS. 1 and 2, will be triggered for overvoltage malfunction detected by the comparator circuits. The predetermined magnitude of current through Q2 440 is calculated according to the following equation:

$$OV_{Current} = \frac{V_{z\_D2} - V_{be(on)\_Q2}}{R5}$$

The voltage across the sense terminals SNS+ 434 and SNS− 436 can be calculated according to the following equation:

$$V_{sensed} = \frac{V_{z\_D2} - V_{be(on)\_Q2}}{R5} \times (R6 + R7)$$

Because the supply voltages are monitored by comparator circuits 310-340, depicted in FIG. 3, and the output of the comparator circuits is used to control the enhanced current source 402, the protection circuit can monitor an overvoltage malfunction over multiple power supplies and reuse the dedicated overcurrent protection mechanism that includes the configurable cooldown period and delay period. In this manner, injecting the current to overcurrent sensing loop of the switch driver circuit uses the overcurrent protection features of the switch driver circuit to protect the downstream load for a variety of conditions.

Voltage verification circuit 450 is configured to prevent spurious overvoltage triggering and other errors when the supply voltage, Vsup 408, is less than a specified magnitude, such as during start-up. The supply voltage verification circuit, i.e. voltage verification circuit 450, is configured to determine whether Vsup 408 for current source 402 is above a predetermined supply voltage threshold magnitude. When voltage verification circuit 450 determines that Vsup 408 is less than the predetermined supply voltage threshold, the voltage verification circuit 450 is configured to disable current source 402.

The voltage comparator circuits depicted in FIG. 3 are supplied by Vsup 308, which is the same as Vsup 408 in FIG. 4. Therefore, the comparator circuits may operate properly after Vsup 408 reaches the rated operating voltage for the comparator circuits. Voltage verification circuit 450 is configured to disable current source 402 when the potential of Vsup 408 is too low to supply the comparator circuits properly.

Voltage verification circuit 450 includes a PNP BJT transistor Q1 452. The base of Q1 452 connects to Vsup 408 through resistor R1 456. The base of Q1 452 also connects to the cathode of Zener diode D1 454 through resistor R2 458. Resistors R1 456 and R2 458 form a voltage divider. The anode of D1 454 connects to ground. The emitter of Q1 452 connects directly to Vsup 408. The collector of Q1 452 is the connection of voltage verification circuit 450 to the current source portion of current source 402 at resistor R3 426.

In operation, Q1 452 is cut off when the potential of Vsup 408 is lower than:

$$V_{sup}(R1+R2)/R1 * V_{be(on)\_Q1} + V_{z\_D1},$$

where $V_{be(on)\_Q1}$ is the base-emitter ON voltage of Q1 and $V_{z\_D1}$ is Zener voltage of D1. When Vsup 408 is too low, Q1 452 is cut off and the base voltage of Q2 440 is pulled down to GND by resistor R4 448. In this cut off condition, current source 402 is disabled with open-collector output regardless of the logical signal on OV_Status 404. After the potential of Vsup 408 reaches $$V_{sup}=(R1+R2)/R1 * V_{be(on)Q1} + V_{z\_D1}$$

then Q1 452 is conducting, and the base voltage of Q2 440 is clamped to the Zener voltage of D2, $V_{z\_D2}$, which enables current source 402

Figure 5:
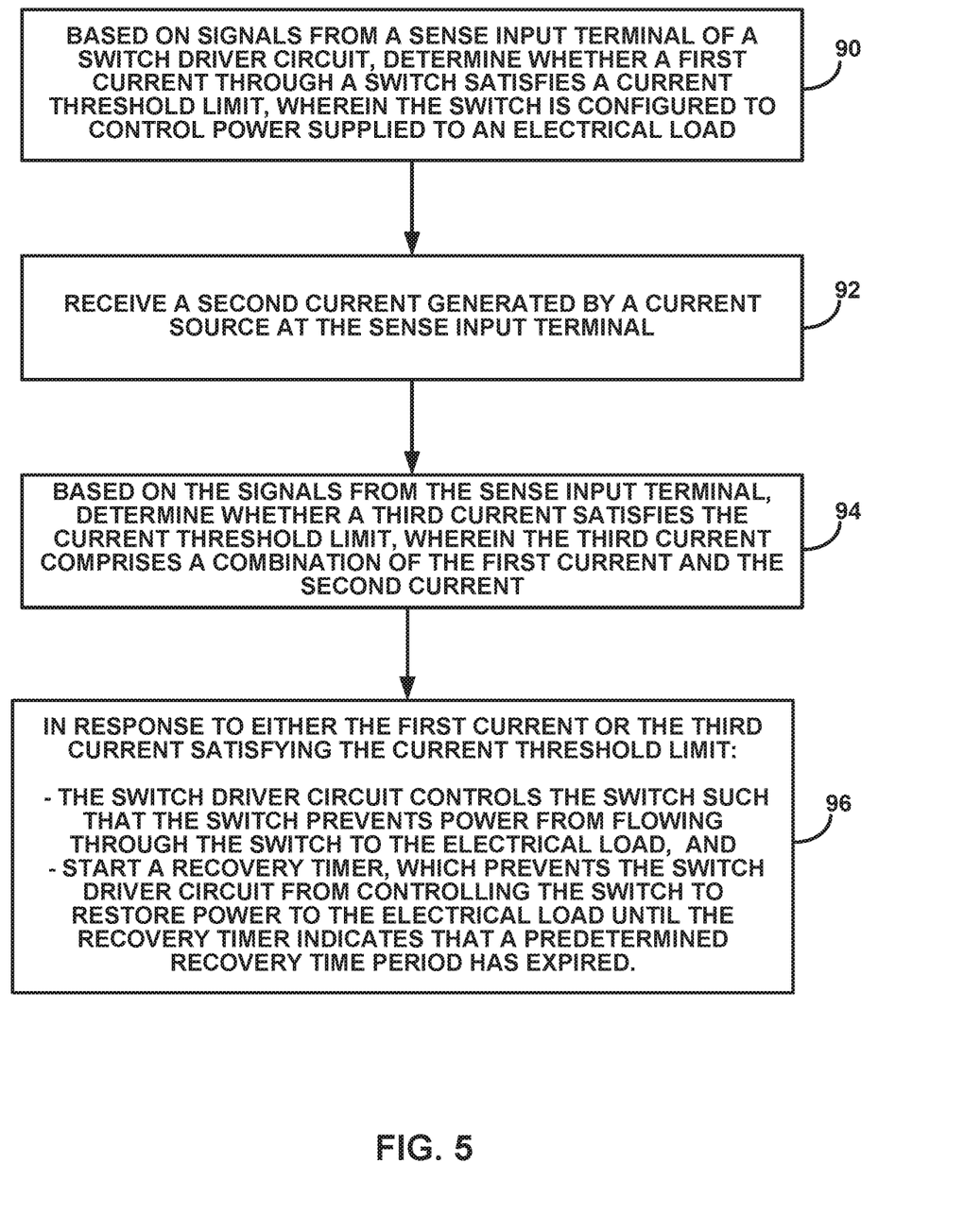
FIG. 5 is a flow chart illustrating an example operation of the protection circuitry according to one or more techniques of this disclosure.

FIG. 5 is a flow chart illustrating an example operation of the protection circuitry according to one or more techniques of this disclosure. The blocks of FIG. 5 will be explained with respect to FIG. 2, unless otherwise noted, but are not limited only to the implementation of FIG. 2.

Based on signals from sense input terminals SNS+ 234 and SNS− 236 of switch driver circuit 203, determine whether the current through switch Q3 218 satisfies a current threshold limit (90). The current threshold limit may be set to detect an overcurrent condition within load 240, or an overcurrent condition that may be caused by the power supplied at Vin 110. As described above in relation to FIG. switch Q3 218 is configured to control power supplied to electrical load 240, which may include one or more power supplies.

Based on detecting an overvoltage condition by voltage comparator circuit 201, or detecting some other condition by processing circuitry 250, switch driver circuit 203 may receive an additional current at sense input terminals SNS− 236 (92). As described above in relation to FIGS. 2-4, current source 202 generates a predetermined magnitude of current based on receiving an indication from voltage comparator circuit 201. The magnitude of the additional current may be selected based on selecting the values of the components of voltage comparator circuit 201, such as the values for the resistors and the breakover voltages of the Zener diodes.

Based on additional signals from the sense input terminals SNS+ 234 and SNS− 236, logic 230 of switch driver circuit 203 determines whether the additional current satisfies the current threshold limit (94). Thus, the current through R6 216 and R7 220 includes a combination of the current through switch Q3 218 and the additional current through OV_current 206 to current source 202. The combined current causes an increased voltage that is measured by sense input terminals SNS+ 234 and SNS− 236.

In response to either the current through switch Q3 218, or the combined current generated by current source 202, switch driver circuit 203 controls switch Q3, 218 such that the switch prevents power from flowing through switch Q3 218 to electrical load 240 (96). At the same time, switch driver circuit 203 may activate a recovery timer, tracked by timer circuitry 232. Switch driver circuit 203 is prevented from controlling switch Q3 218 to restore power to electrical load 240 until the recovery timer indicates that a predetermined recovery time period has expired. The recovery time may allow one or more components of load 240 to cool off after an overcurrent event, for example. The length of the recovery timer may be configured as needed. In the example of FIG. 1, the value of capacitor C1 122 set the length of the recovery timer.

Various examples of the disclosure have been described. These and other examples are within the scope of the following claims.

What is claimed is:

1. A circuit comprising:
    a switch comprising a control input (gate of Q3), wherein the switch is configured to control power supplied to a load; and
    a switch driver circuit comprising:
        a first sense input (SNS+) and a second sense input (SNS−);
        a switch control output coupled to the control input of the switch;
        logic circuitry coupled to the first sense input and the second sense input, the logic circuitry configured to:
            determine whether a first current through the switch satisfies a threshold, based on signals from the first sense input and the second sense input,
    wherein the switch driver circuit is configured to:
        receive a second current at the second sense input;
        determine whether a third current satisfies the threshold, wherein the third current comprises the first current and the second current; and
        in response to determining that the third current satisfies the threshold, the logic circuitry is configured to cause the switch control output to turn off the switch.

2. The circuit of claim 1, further comprising a current source,
    wherein the second current is generated by the current source, and
    wherein the current source is triggered to output the second current based on a received logic signal.

3. The circuit of claim 2, wherein the load comprises one or more power supply circuits.

4. The circuit of claim 3, wherein the received logic signal is based on whether an output voltage of the one or more power supply circuits satisfies a threshold voltage magnitude.

5. The circuit of claim 4,
    wherein a respective output voltage of each of the one or more power supply circuits is compared to a respective threshold voltage magnitude by a respective comparator circuit, and
    wherein the respective comparator circuit is configured to generate the logic signal received by the current source based on the comparison.

6. The circuit of claim 2, wherein the logic signal received by the current source is based on a non-voltage condition.

7. The circuit of claim 6, wherein the non-voltage condition comprises one or more of temperature, timing, and fault conditions.

8. The circuit of claim 2, wherein
    the current source comprises a supply voltage verification circuit,
    the supply voltage verification circuit is configured to determine whether a supply voltage for the current source is above a predetermined supply voltage threshold, and
    in response to determining that the supply voltage for the current source is less than the predetermined supply voltage threshold, the supply voltage verification circuit is configured to disable the current source.

9. The circuit of claim 1, further comprising a recovery timer configured to determine when a recovery time period has expired, wherein:
    the recovery timer is configured to start the recovery time period when the logic circuitry causes the switch control output to turn off the switch, and
    the recovery timer is configured to prevent the logic circuitry from turning on the switch until the recovery time period has expired.

10. The circuit of claim 1, wherein the second current is generated by a current source, and wherein a magnitude of the second current is based on a selected value of one or more components of the current source.

11. A system comprising:
    a first power supply circuit and a second power supply circuit (100);
    a switch (Q3) configured to control power delivered to the first power supply circuit and the second power supply circuit; and
    a switch driver circuit:
        comprising:
            a first sense input (SNS+) and a second sense input (SNS−);
            a switch control output coupled to a control input of the switch;
            logic circuitry coupled to the first sense input and the second sense input, the logic circuitry configured to:
                determine whether a first current through the switch satisfies a threshold, based on signals from the first sense input and the second sense input,
        wherein the switch driver circuit is configured to:
            receive a second current at the second sense input;
            determine whether a third current satisfies the threshold, wherein the third current comprises the first current and the second current; and
    in response to determining that the third current satisfies the threshold, the logic circuitry is configured to cause the switch control output to turn off the switch.

12. The system of claim 11, further comprising a current source,
wherein the second current is generated by the current source, and
wherein the current source is triggered to output the second current based on a received logic signal.

13. The system of claim 12, wherein the logic signal is based on whether:
an output voltage of the first power supply circuit satisfies a first threshold voltage magnitude; and
an output voltage of the second power supply circuit satisfies a second threshold voltage magnitude.

14. The system of claim 13,
wherein a first comparator circuit compares the output voltage of the first power supply circuit to the first threshold voltage magnitude,
wherein a second comparator circuit compares the output voltage of the second power supply circuit to the second threshold voltage magnitude, and
wherein the first comparator circuit and the second comparator circuit are configured to generate the logic signal received by the current source.

15. The system of claim 12, further comprising one or more processors configured to:
monitor one or more characteristics of the system;
generate the logic signal received by the current source based on the one or more characteristics of the system.

16. The system of claim 15, wherein the one or more characteristics of the system comprise any one or more of a temperature, one or more signals outside of a specified range, and detected mechanical damage.

17. The system of claim 12, wherein:
the current source comprises a supply voltage verification circuit,
the supply voltage verification circuit is configured to determine whether a magnitude of the supply voltage for the current source is at least at a predetermined supply voltage threshold, and
in response to determining that the magnitude of the supply voltage for the current source is less than the predetermined supply voltage threshold, the supply voltage verification circuit is configured to disable the current source.

18. The system of claim 11, wherein the switch driver circuit further comprises a recovery timer configured to determine when a recovery time period has expired, wherein:
the recovery timer is configured to start the recovery time period when the logic circuitry causes the switch control output to turn off the switch, and
the recovery timer is configured to prevent the logic circuitry from turning on the switch until the recovery time period has expired.

19. A method comprising:
based on signals from a sense input terminal (SNS+ or SNS−) of a switch driver circuit, determining, by the switch driver circuit, whether a first current through a switch satisfies a threshold limit, wherein the switch is configured to control power supplied to an electrical load;
receiving at the sense input terminal, a second current, wherein the second current is generated by a current source;
based on the signals from the sense input terminal, determining, by the switch driver circuit, whether a third current satisfies the threshold limit, wherein the third current comprises a combination of the first current and the second current;
in response to either the first current or the third current satisfying the threshold limit,
controlling, by the switch driver circuit, the switch such that the switch prevents power from flowing through the switch to the electrical load;
starting a recovery timer, wherein the switch driver circuit is prevented from controlling the switch to restore power to the electrical load until the recovery timer indicates that a predetermined recovery time period has expired.

20. The method of claim 19, further comprising:
monitoring one or more characteristics of the electrical load;
determining whether a respective one of the one or more characteristics satisfies a respective predetermined characteristic threshold limit;
in response to determining that the respective one of the one or more characteristics satisfies the respective predetermined characteristic threshold limit, sending a control signal to the current source to generate the second current;
determining, by the current source, whether a supply voltage to the current source satisfies a predetermined supply voltage threshold limit;
in response to determining that the supply voltage to the current source satisfies the predetermined supply voltage threshold limit, preventing the current source from activating the second current.

* * * * *